United States Patent [19]

Kurachi

[11] Patent Number: 5,471,550
[45] Date of Patent: Nov. 28, 1995

[54] APPARATUS FOR CONVERTING IMAGE OUTLINE DATA INTO DOT DATA REPRESENTATIVE OF IMAGE DOTS

[75] Inventor: Atsuhiko Kurachi, Aichi, Japan

[73] Assignee: Brother Kogyo Kabushiki Kaisha, Nagoya, Japan

[21] Appl. No.: 151,850

[22] Filed: Nov. 15, 1993

[30] Foreign Application Priority Data

Nov. 16, 1992 [JP] Japan .................... 4-305653

[51] Int. Cl.⁶ .................................. G06K 9/48
[52] U.S. Cl. ........................... 382/200; 382/289
[58] Field of Search ................ 382/22–24, 46, 382/55; 345/136; 395/150, 151, 128, 143

[56] References Cited

U.S. PATENT DOCUMENTS

| | | | |
|---|---|---|---|
| 5,038,385 | 8/1991 | Kasahara | 382/22 |
| 5,050,228 | 9/1991 | Yoshida et al. | 382/55 |
| 5,073,956 | 12/1991 | Kawamoto et al. | 382/22 |
| 5,086,481 | 2/1992 | Yoshida et al. | 382/22 |
| 5,091,976 | 2/1992 | Murayama | 382/22 |
| 5,093,653 | 3/1992 | Ikehira | 382/46 |
| 5,099,435 | 3/1992 | Collins et al. | 395/128 |
| 5,105,471 | 4/1992 | Yoshida et al. | 382/55 |
| 5,155,805 | 10/1992 | Kaasila | 395/151 |
| 5,191,438 | 3/1993 | Katsurada et al. | 382/46 |
| 5,309,554 | 5/1994 | Ito | 395/151 |

FOREIGN PATENT DOCUMENTS

53-41017 10/1978 Japan .

*Primary Examiner*—Joseph Mancuso
*Assistant Examiner*—Gerard Del Rosso
*Attorney, Agent, or Firm*—Oliff & Berridge

[57] ABSTRACT

A data converting apparatus mainly includes: a memory part for storing at least one set of outline data representative of an outline of one character which includes at least one straight line segment; a first determining part for comparing each of the at least one straight line segment with a predetermined reference direction and for determining whether the corresponding straight line segment has an orientation sufficiently similar to the orientation of the predetermined reference direction; a second determining part for determining whether a offset error produced when the straight line element determined by the first determining part is converted to a dot image deviates from a predetermined tolerance range; and a correction part for correcting the straight line segment determined by the second judging part so that the offset error of the straight line segment does not exceed the tolerance range; and filling-in part for converting the outline data including the straight line segment corrected by the correction part to a dot image and outputting dot data representative of the dot image.

11 Claims, 11 Drawing Sheets

| FLAGS | DATAS | | |
|---|---|---|---|
| S | (x0, y0) | | |
| L | (x3, y3) | | |
| B | (x2, y2) | (x1, y1) | (x0, y0) |
| S | (x4, y4) | | |
| L | (x5, y5) | | |
| B | (x6, y6) | (x7, y7) | (x4, y4) |

(a)

P0: (0.0, 0.0)
P1: (1.0, 0.0)
P2: (0.3, 4.0)
P3: (1.3, 4.0)
dx0 = 0.3

(b)

P0: (0.15, 0.0)
P1: (1.15, 0.0)
P2: (0.15, 4.0)
P3: (1.15, 4.0)

APPARATUS FOR CONVERTING IMAGE OUTLINE DATA INTO DOT DATA REPRESENTATIVE OF IMAGE DOTS

BACKGROUND OF THE INVENTION

1. Field of the Invention

The present invention relates in general to an apparatus for converting outline data representative of an outline of an image such as a letter, a symbol and a graphical representation, into dot data representative of dots to be formed to reproduce the image. More particularly, the present invention is concerned with improvements in such a data converting apparatus.

2. Discussion of the Prior Art

Images such as characters including letters and symbols represented by image data are printed, displayed or otherwise reproduced according to the image data suitably processed by a computer. Commonly, the image data takes the form of dot data indicating whether a dot should be formed in each of picture elements which are the smallest part of picture image and which determine the resolution of the reproduced image. If a batch of dot data representative of all the images available for reproduction is prepared and stored in an image data memory such as a character data memory, the memory should have an extremely large storage capacity. It is therefore desirable to store a batch of outline data representative of the outlines of the images such as the characters, and convert the outline data into the corresponding dot data by suitable data converting means, when the images are printed, displayed or otherwise reproduced by reproducing means, as disclosed in Japanese Patent Publication No. 53-41017.

In order to convert the outline data into the dot data, the outline data is subjected to a filling-in process, in which the outline data is first defined in a two-dimensional coordinate system. More specifically, the outline of the character represented by the outline data is superimposed on a two-dimensional coordinated pixel screen in which picture elements are defined by a plurality of parallel scanning lines parallel to one of X and Y axes. The size of the picture element and the manner in which the picture elements are distributed on the pixel screen correspond to scanning characteristics of reproducing means such as the printer or display. The picture elements correspond to the resolution of the reproducing means. The filling-in process then searches or determines a picture element that lies in the pixel screen within the area defined by the outline of the character and that should be filled with an image dot. This filling-in process is attained by arithmetic calculation such that an image dot may be produced on each picture element where the relationship between the corresponding picture element and the outline satisfies a predetermined requirement. Thus, the area surrounded by the outline is filled with image dots. Then, dot data are produced such that logical values in bits of the dot data may indicate the presence of image dots at the picture elements within the outline of the character.

The predetermined requirement employed in the arithmetic calculation of the filling-in process, however, causes positions of the picture elements lying within the outline of a character to vary, depending upon the position at which the character outline is positioned relative to the coordinated pixel screen, i.e., depending upon the position at which the character is desired to be printed, displayed or otherwise reproduced. In this case, shape of the character as reproduced according to the dot data may differ from the nominal shape represented by the outline data. Especially when the character has a linear or straight outline segment inclined with respect to the X or Y axis in the pixel screen, positions of the picture elements which lie along and within the straight outline segment vary, at different local portions of the straight outline segment. Accordingly, when character is reproduced by the dot data, the portion of the character corresponding to the inclined straight outline segment tends to differ from the intended or desired inclined straight line.

SUMMARY OF THE INVENTION

The present inventor has investigated various changes in the aesthetic effect of characters caused due to the conversion of the outline data into the dot data. The present inventor has then noted that especially when the straight outline segment is slightly inclined or slanted with respect to the X or Y axis or other noted directions, positions of the image dots arranged along and within the straight outline segment vary relatively largely with respect to the overall inclination amount of the outline segment. The change in positions of the image dots becomes noticeable in view of the overall inclination or slant amount of the outline segment. The reproduced character therefore has a poor appearance. Especially when the size of the straight outline segment is small, the change in positions of the image dots may largely affect the appearance of the reproduced dot image which is completely different from the nominal shape represented by the outline data. Accordingly, the desired character shape is completely destroyed.

It is therefore an object of the present invention to provide a data converting apparatus capable of converting outline data into dot data so that the shape of an image as reproduced according to the dot data becomes substantially equal to or sufficiently close to the nominal shape as defined by the outline data.

The present inventor has found that the above-described problems occur due to the arithmetic calculation employed in the filling-in process. On the pixel screen used in the filling-in process, each picture element is formed to have a unit size which corresponds to or represents a dot or pixel of the output medium. In other words, the pixel screen is quantized to picture elements having unit sizes. In the arithmetic calculation, a coordinate value for each point on the outline segment is first defined relative to the pixel screen. Then, the coordinate value is quantized or converted into an integer value, for determining a picture element on which an image dot should be located along and within the outline segment. A straight outline segment slightly inclined with respect to the pixel screen has opposite end points which are shifted from each other with a certain shift amount corresponding to the inclination amount. When the coordinate values of the opposite end points are quantized to integers, the shift amount is also quantized to an integer value which results in the corresponding number of dot shift of image dots on the pixel screen. (This integer value will be referred to as a "offset," hereinafter.) It is noted that when the position of the outline segment relative to the pixel screen is changed, the number of dots shifted may also vary even though the actual shift amount is unchanged. In addition, when the size of the straight outline segment is small, the relative amount of the dot shift with respect to the overall size of the outline segment becomes large, resulting in completely destroying the shape of the outline segment.

Accordingly, the present invention provides a data converting apparatus for converting a set of outline data representative of an outline of a desired image, such as a character, into a set of dot data representative of a dot image corresponding to the desired image, the apparatus comprising: memory means for storing at least one set of outline data each representative of an outline of an image which includes at least one of a straight line segment and a curved line segment; selection means for selecting one set of outline data representative of an outline of a desired image; straight line segment determining means for determining whether the outline of the desired image selected by the selection means includes at least one straight line segment; direction determining means for comparing, with a predetermined reference direction, each of the at least one straight line segment of the outline determined by the straight line segment determining means, and for determining whether a difference defined between a direction of the each of the at least one straight line segment and the predetermined reference direction falls within a predetermined range; offset error determining means for determining whether a offset error produced when a straight line segment determined by the direction determining means is converted to a dot image deviates from a predetermined tolerance range; correction means for correcting a straight line segment determined by the offset error determining means so that the offset error of the straight line segment may not exceed the tolerance range; and filling-in means for converting the outline data including the straight line segment corrected by the correction means to a dot image and outputting dot data representative of the dot image.

According to another aspect, the present invention provides a data converting apparatus for converting a set of original outline data representative of an outline of a desired image such as a letter, a symbol and a graphical representation, into a set of dot data which is indicative of whether an image dot is to be formed in each of picture elements positioned in a coordinate system, the apparatus comprising: memory means for storing a plurality of sets of original outline data each indicative of an outline of an image which includes at least one of a straight line segment and a curved line segment; selection means for selecting one set of original outline data indicative of an outline of one desired image; coordinate converting means for converting the original outline data for the desired image into original data of coordinate values indicative of a position of at least one point on the outline of the desired image relative to a coordinate system where picture elements are defined to be arranged, the original data of coordinate values including coordinate values of opposite end points of each of at least one straight line segment if the outline of the desired image includes the at least one straight line segment; straight line segment determining means for determining whether the outline selected by the selecting means includes at least one straight line segment; angle determining means for determining whether an angle defined between each of the at least one straight outline segment determined by the straight line segment determining means and a predetermined reference direction defined in the coordinate system falls within a predetermined threshold angle; offset error determining means for determining whether a offset error which will be possibly occurred through adjusting of coordinate values of opposite end points of the straight line segment determined by the angle determining means exceeds a predetermined tolerance range; correcting means for correcting the straight line segment determined by the offset error determining means into corrected straight line segment which may prevent a offset error which will be possibly occurred through adjusting of coordinate values of the opposite end points of the corrected straight line segment from exceeding the predetermined tolerance range, the correcting means changing the original data of coordinate values for the outline including the corrected straight line segment into corrected data of coordinate values; and filling-in means for quantizing one of the original data of coordinate values and the corrected data of coordinate values for the outline of the desired image so as to determine picture elements on the coordinate system where image dots should be located for producing a dot image substantially reproducing the desired image and for producing a set of dot data indicative of the dot image.

According to further aspect, the present invention provides a character output device for outputting a character image, comprising: memory means for storing one set of outline data representative of an outline of one character which includes at least one straight line segment; first determining means for comparing each of the at least one straight line segment witch a predetermined reference direction and for determining whether a difference defined between a direction of the each of the at least one straight line segment and the predetermined reference direction falls within a predetermined range; second determining means for determining whether a offset error produced when the straight line element determined by the first determining means is converted to a dot image deviates from a predetermined tolerance range; correction means for correcting the straight line segment determined by the second judging means so that the offset error of the straight line segment does not exceed the tolerance range; and filling-in means for converting the outline data including the straight line segment corrected by the correction means to a dot image and outputting dot data representative of the dot image.

BRIEF DESCRIPTION OF THE DRAWINGS

The above and other objects, features and advantages of the invention will become more apparent from reading the following description of the preferred embodiment taken in connection with the accompanying drawings in which.

DETAILED DESCRIPTION OF THE INVENTION

Figure 1:
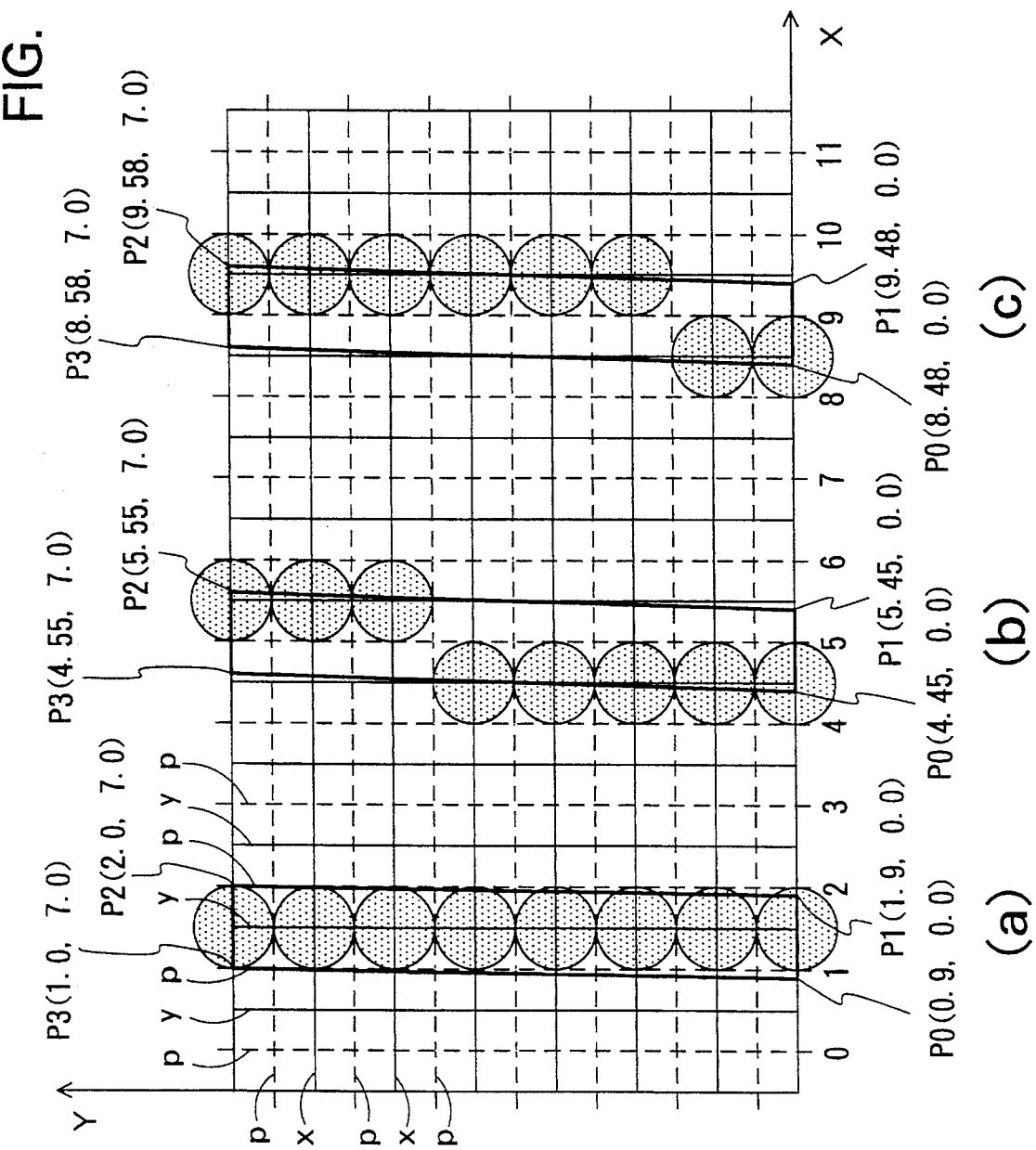
FIG. 1 illustrates that slightly-slanted outlines represented by outline data are superposed on a pixel screen at different positions and image dots are produced within the outlines through a filling-in process.

The present invention will be described in great detail hereinafter, with reference to the accompanying drawings wherein like parts and components are designated by the same reference numerals.

First, the mechanism of how the filling-in process produces the offset error will be described in greater detail hereinafter. One concrete example of the filling-in process will be described hereinafter. This concrete example shows the state that outline data for a character "I" is converted into dot data. FIG. 1 shows that outlines of three identical characters "I" are superimposed on a coordinated pixel screen at different positions (a), (b) and (c). The pixel screen consists of a multiplicity of picture elements. The picture elements are defined by equally spaced-apart x-axis partition lines p parallel to the X-axis of the screen, and equally spaced-apart y-axis partition lines p which are parallel to the Y-axis of the screen and perpendicular to the x-axis partition lines p. Thus, the picture elements are square in shape. An image dot placed on a picture element indicates that a dot should be printed or displayed at the corresponding picture element. There are also provided multiple x-axis scanning lines x which extend parallel to the X-axis and are positioned intermediate between the adjacent x-axis partition lines p, and multiple y-axis scanning lines y which extend parallel to the Y-axis and are positioned intermediate between the adjacent y-axis partition lines p. Each x-axis scanning line x passes the centers of the picture elements in a corresponding row parallel to the X-axis, while each y-axis scanning line y passes the centers of the picture elements in a corresponding column parallel to the Y-axis. The x-axis and y-axis scanning lines are determined in correspondence with a scanning manner employed in a reproducing system such as a display or a printer. Through the filling-in process, circular-shaped image dots are formed in the square-shaped picture elements that have their center positions located within or exactly on the outline of the character.

The outline of the character "I" is slightly inclined with respect to the Y axis. The character "I" has a parallelogram shape with its width along the X axis of a value of 1. The outline of the character is formed from four outline segments extending between points P0 and P1, P1 and P2, P2 and P3, and P3 and P0. The X-coordinates for the points P0 and P3 are shifted by a value of 0.1 from each other, so that the outline segment P0-P3 slants at an angle with respect to the Y axis. Similarly, the X-coordinates for the points P1 and P2 are shifted by the same value of 0.1, so that the outline segment P1-P2 also slants at the same angle with respect to the Y axis. In the filling-in process, since image dots have to be produced exactly on picture elements of the pixel screen, although the image dots are produced to follow the line segments P0-P3 and P1-P2 as closely as possible, this slant of these line segments causes image dots to form different patterns under the different conditions as shown in FIG. 1. The reason for this will be explained in more detail below.

As described already, the picture elements on the pixel screen are quantized to have unit sizes that is, pixel sizes. In the filling-in process, a coordinate value for each point on the outline segment is first defined relative to the pixel screen, and then the coordinate value is quantized to an integer, which represents a picture element on which an image dot should be located along and within the outline segment. In order to quantize the coordinate value, the coordinate value may be rounded to the nearest integer (which also will be expressed as half-adjusted), rounded up to the nearest larger integer, or rounded off to the nearest smaller integer. Other methods can be used for quantizing the coordinate value.

In this illustrative example of FIG. 1, an X-coordinate value for each point on the line segment P0-P3 is quantized by being rounded to the nearest integer. For example, in the case of (a), the coordinates of the points P0 and P3 positioned on the outline segment P0-P3 are (0.9, 0.0) and (1.0, 7.0), respectively. Accordingly, in the filling-in method, the X coordinate for the point P0 of 0.9 is half-adjusted to 1. Accordingly, the point P0 produces an image dot in a picture element with its lefthand side having the X coordinate of 1 which is the partition line P. Similarly, the X coordinate for the point P3 of 1.0 is half-adjusted to 1. Accordingly, the point P3 produces an image dot in a picture element with its lefthand side also having the X coordinate of 1. Since the X-coordinates for points arranged on the outline segment P0-P3 are all rounded to 1 when rounded to the nearest integer, image dots are produced in picture elements with their lefthand sides all having the X coordinates of 1. Consequently, all the image dots are produced to form a nicely aligned column.

In the case of (b), however, when rounded to the nearest integer the X coordinate for P0 of 4.45 is rounded to 4, while the X coordinate for P3 of 4.55 is rounded to 5. Accordingly, the P0 produces an image dot on a picture element with its left-hand side having the X-coordinate of 4, but the P3 produces an image dot on a picture element with its left-hand side having the X-coordinate of 5. Thus, the P0-based image dot and the P3-based image dot are shifted from each other by a unit distance of 1 along the X axis. In the present description, this distance between the image dots produced based on two end points of the outline segment is referred to as a offset error. In this case, the offset error is therefore 1. This offset error greatly exaggerates the slant, particularly when a character has a small size. This distorts the pattern created by the dot data and damages the symmetry and quality of the character. (Please note that the above-described case (a) obtains the offset error of 0.)

The case of (c) shows another instance where the offset error is 1. The X coordinate for P0 of 8.48 is half-adjusted to 8, based on which an image dot is produced on a picture element with its left-hand side having the X-coordinate of 8. However, the X coordinate for P3 of 8.58 is half-adjusted to 9, and accordingly an image dot is produced on a picture element with its left-hand side having the X-coordinate of 9. As can be seen by comparing the cases (b) and (c), the position where the offset error causes a shift of picture elements can vary under different circumstances. This degrades the quality of reproduced characters.

Therefore, even though the difference between the X coordinates of two points P0 and P3 is only 0.1, the positional relationship between the screen and the X coordinates can produce an image dot shift of 1 at maximum. That is, the positional relationship between the outline and the screen can generate a maximum offset error of 1. Accordingly, in the present invention, as will be described later, the maximum value for the offset error is defined by rounding up, to the nearest larger integer, the actual change (0.1 in this case) of the two end points on the outline segment.

Designers intend to design line segments at a slight angle to a predetermined reference direction, such as the X or Y axis or other various directions so as to produce an aesthetic effect. However, as apparent from the above discussion, the scanning manner employed in the reproducing system as represented by the pixel screen sometimes prevent actual expression of this design intention. Accordingly, a dot image reproduced by the reproducing system sometimes differs from the designer's intended image represented by the outline data. The above-described offset error therefore represents the degree to which the dot image deviates from the designer's intended image.

Especially when the image size is small, the offset error may cause dot shifts extremely pronounced relative to the size of the image that destroy the character design. In such cases, it is necessary to correct for the offset error and preserve the appearance of the character, even though the correction will sacrifice the design intention, that is, the desire to provide the line slightly slanted from the predetermined reference line. In the present invention, as will be described later, the degree by which the offset error will possibly deform or destroy the character is defined by the ratio between the maximum offset error and the shift amount of the two points on the slanted outline segment P0-P3 along the X axis (in this case, 0.1) where the shift amount representing the size of the character. If the degree exceeds a predetermined tolerance level, the present invention corrects the outline data to reduce the offset error.

It should be noted that the filling-in process of the above example half-adjusts the coordinates of points on the outline and determines a picture element where an image dot should be located. However, the filling-in process can be attained, not only half-adjusting, that is, rounding to the nearest integer the coordinates but also rounding down or rounding up the coordinates to the next integer. To summarize, the filling-in process can be attained by quantizing the coordinate values of points on the outline. However, for the same reason discussed above for the half-adjusting case, these various types filling-in methods show the same problem caused by the offset of the coordinate values. Accordingly, for the various types of filling-in method, the maximum offset error can be defined by rounding up the actual change of two end points on the slanted line segment.

In addition, the above-described example of the filling-in method produces image dots so that they may have their center positions falling within the area surrounded by the outline. However, other various types of filling-in methods can be used. Those various types of filling-in methods suffer from the same problem for the same reason as discussed above.

Accordingly, the present invention employs, for the various types of filling-in processes, a principle to correct for the outline data before performing the filling-in process, in the case where an arbitrary outline segment is slightly slanted with respect to a predetermined reference direction and where there is a possibility that a offset error will possibly occur due to the slant through the filling-in process that may cause extremely pronounced dot shifts and destroy the character design.

Figure 2:
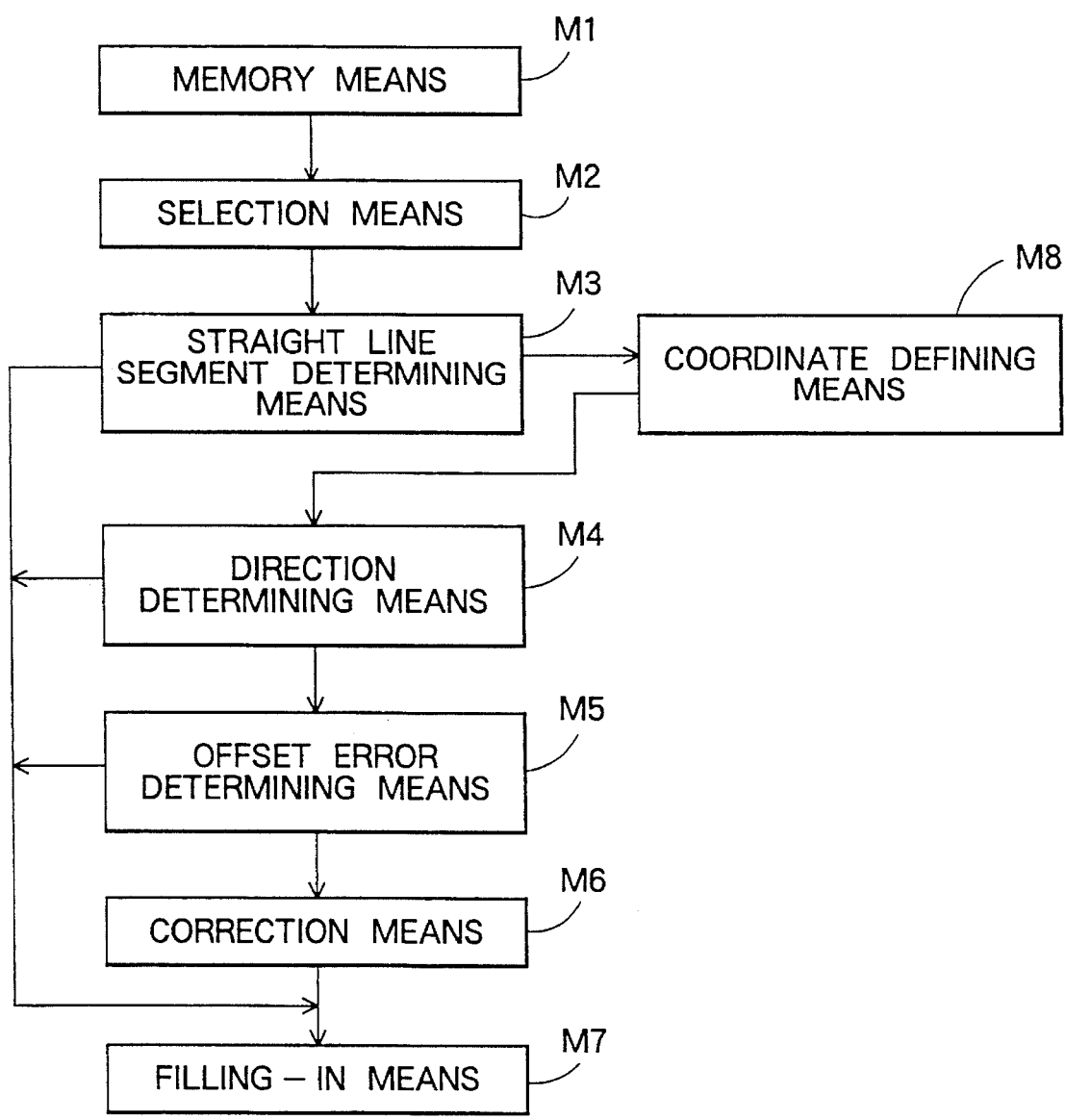
FIGS. 2(a)–2(e) schematically show a structure of a data converting apparatus according to the present invention.
Figure 2:
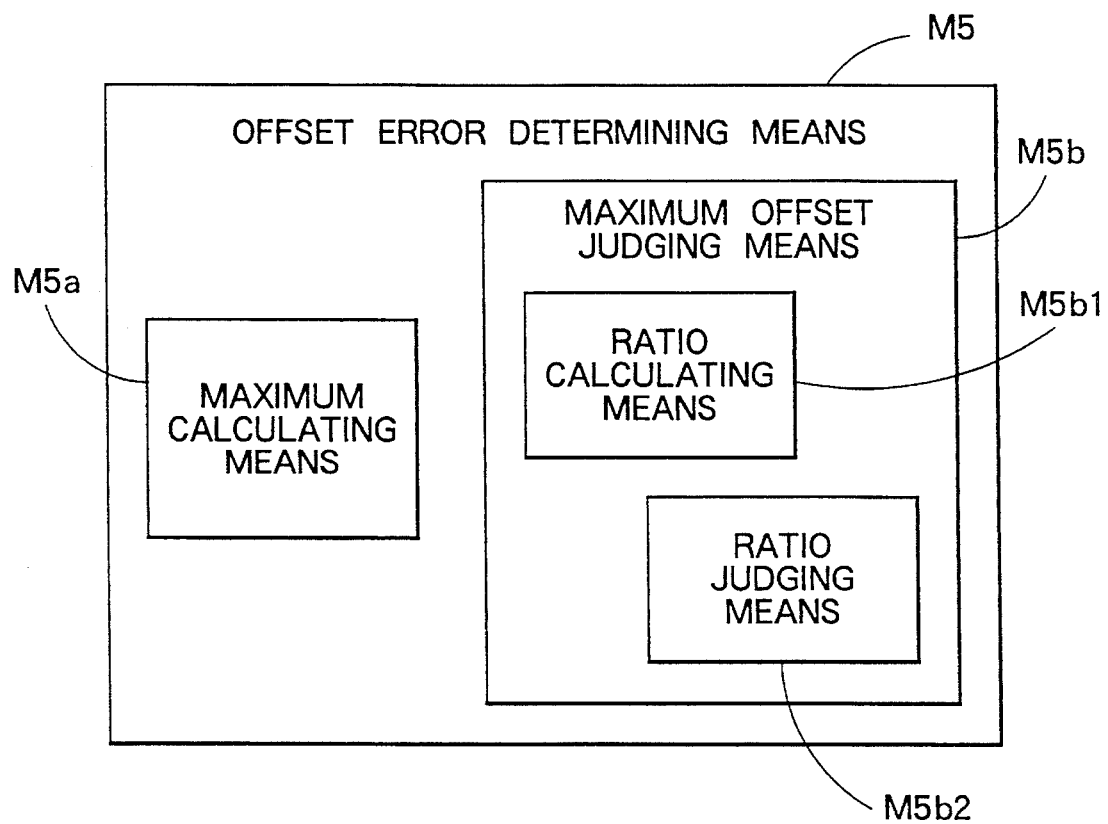
Figure 2:
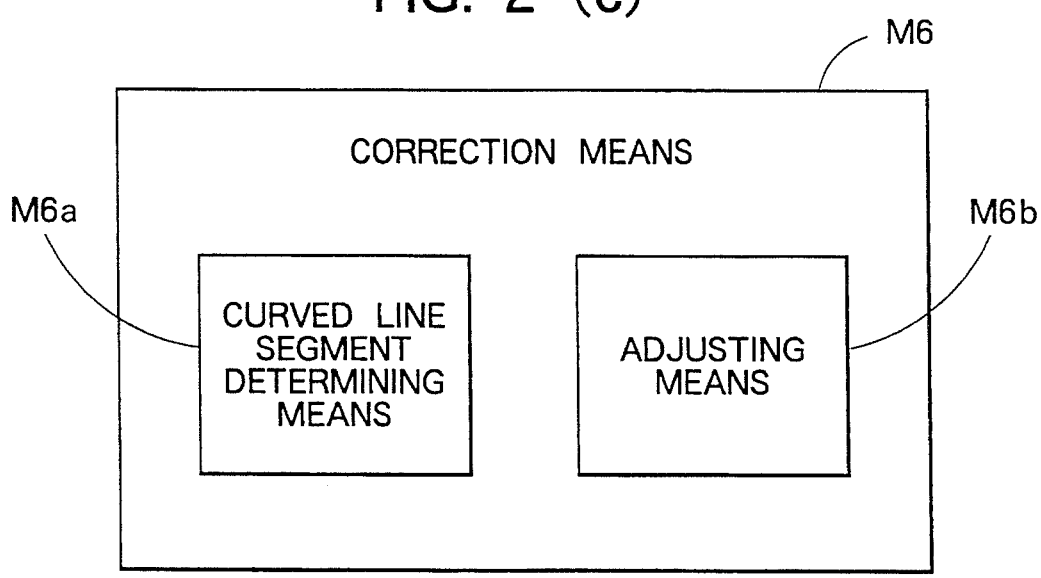
Figure 2:
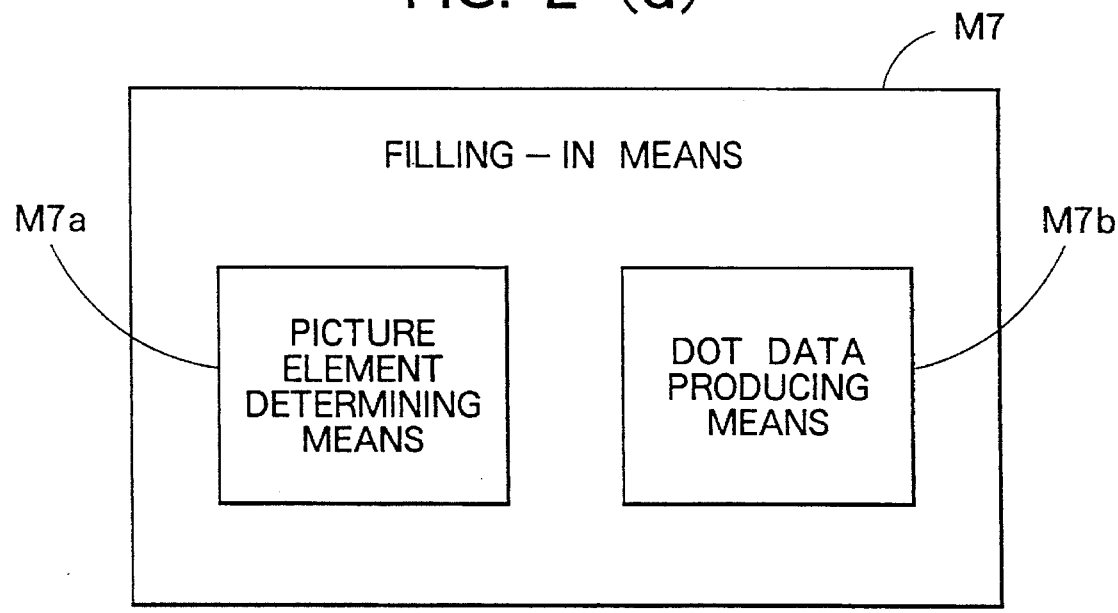
Figure 2:
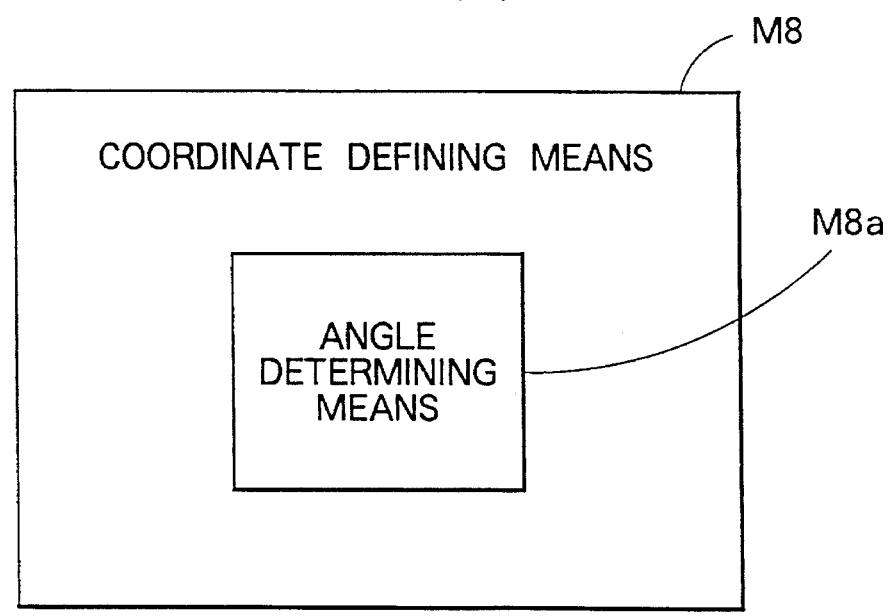

FIG. 2 schematically shows a structure of a data converting apparatus employing the above-described outline data correcting principle of the present invention. The apparatus mainly includes: a memory means M1 for storing at least one set of outline data representative of an outline of one character which includes at least one straight line segment; a selection means M2 for selecting the set of outline data representative of the outline of the desired image; a straight line segment determining means M3 for determining whether the outline data selected includes at least one straight line; a direction determining means M4 for comparing each of the at least one straight line segment with a predetermined reference direction and for determining whether the each of the at least one straight line segment has an orientation sufficiently similar to the orientation of the predetermined reference direction; a offset error determining means M5 for determining whether a offset error produced when the straight line element determined by the direction determining means M4 is converted to a dot image deviates from a predetermined tolerance range; a correction means M6 for correcting the straight line segment determined by the offset error determining means so the quantization error of the straight line segment does not exceed the tolerance range; and a filling-in means M7 for converting the outline data including the straight line segment corrected by the correction means M6 to a dot image by a picture element determining means M7a and outputting dot data representative of the dot image by a dot data producing means M2b.

With this structure, one set of outline data for a desired character, such as a symbol and text, may be first retrieved from the memory means M1 according to an index code for the desired character by the selection means M2. Then, the outline data is scaled to an optional type size (in points) and the outline of the desired image is defined by a coordinate defining means M8 relative to a coordinate system where the dot image is to be formed, before converted to dot data by the direction and quantization error determining means M4 and M5, the correction means M6 and the filling-in means M7. The dot image is then outputted by an output part such as a laser printer or a display, in accordance with the dot data.

Referring to FIGS. 3 through 9, there is illustrated a character output device embodying the above-described data converting apparatus of the present invention. The character output device is a laser printer for converting outline data 10 into dot data and performing a laser printing operation to generate desired characters.

Figure 3:
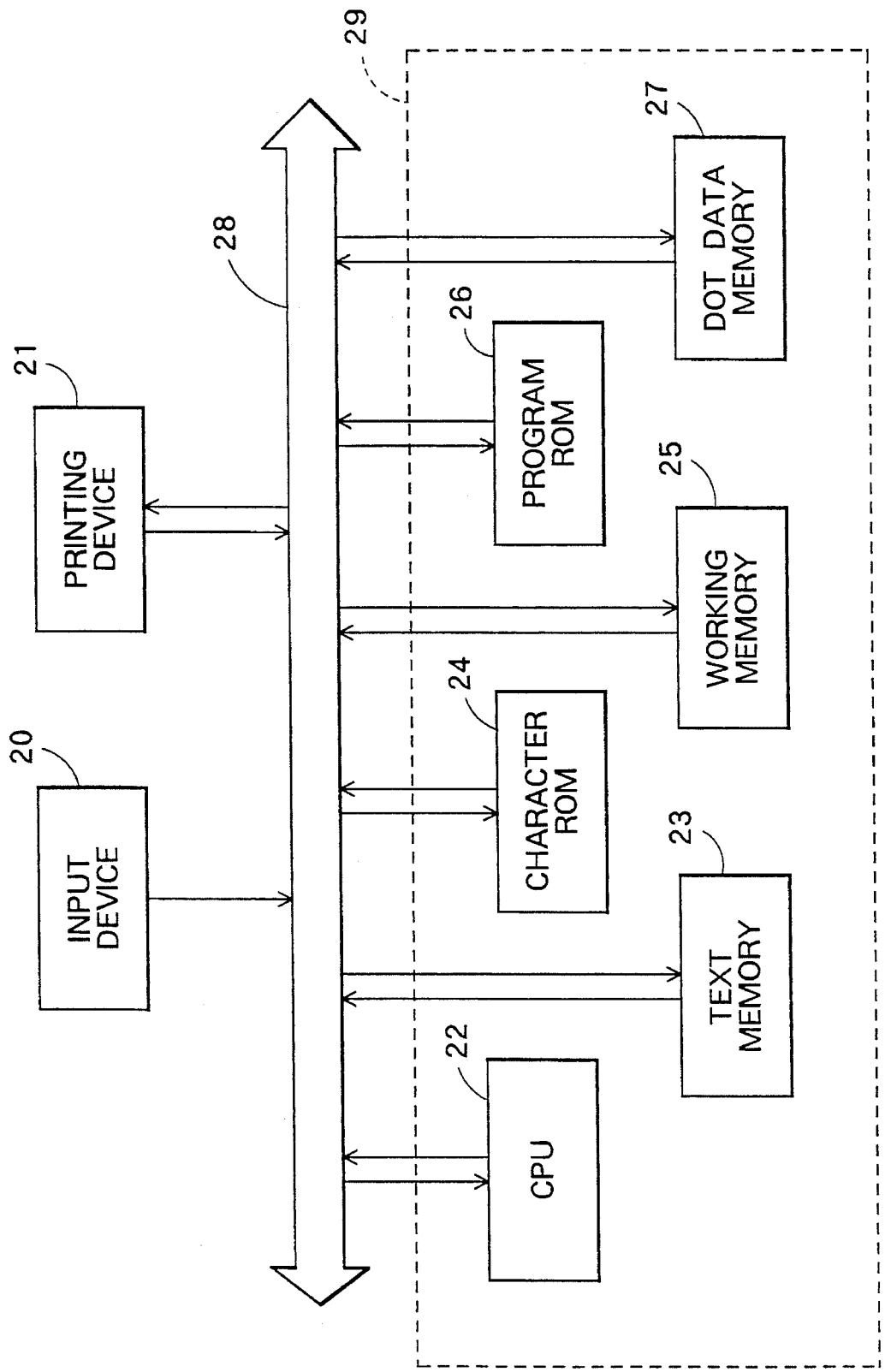
FIG. 3 is a block diagram of a preferred embodiment of the character output device of the present invention.
Figure 4:
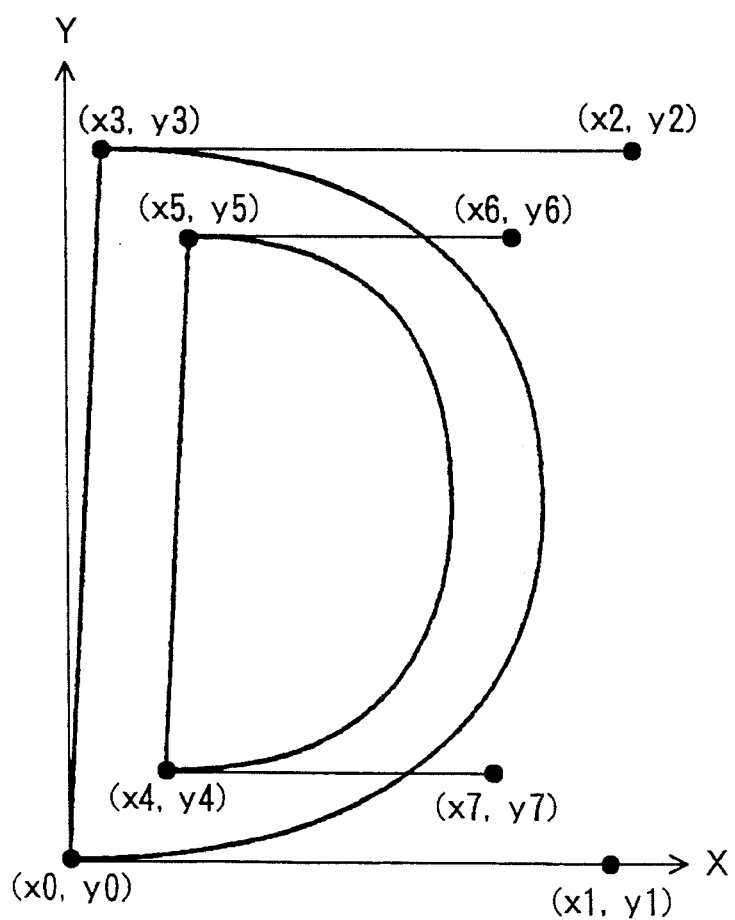
FIG. 4(a) shows outline data and FIG. 4(b) is an outline image represented by the outline data of FIG. 4(a)

FIG. 3 is a block diagram schematically showing the laser printer of the present embodiment. The diagram mainly indicates a portion of a control circuit of the laser printer, which relates to data conversion according to the principle of the present invention. The microcomputer portion 29, forming the main portion of the control circuit, includes a CPU 22; a character ROM 24; a program ROM 26; a text memory 23; a working memory 25; and a dot data memory 27. These are mutually connected via a bus 28. An input device 20 and the printing device 21 are connected to the microcomputer portion 29 via the bus 28.

The input device 20 is for inputting from an external source various information on characters including character codes; character sizes; character positions; and character appearance data, such as rotation or slanting of characters. By electrophotographic methods, the printing device 21 prints dot data read out from the dot data memory 27. The printing device 21 employs a raster scanning operation. Accordingly, a pixel screen used in a filling-in process which will be described later is defined in correspondence with the raster scanning operation. That is, the x-axis and y-axis scanning lines x and y defined on the pixel screen represent the scanning manner employed in the printing device 21.

The programs ROM 26 stores therein program for executing various controls which will be described later. The text memory 23 temporarily stores therein the information inputted from the input device 20. The working memory 25 temporarily stores therein data required when the CPU 22 executes a program. The dot data memory 27 temporarily stores therein dot data converted from outline data.

The character ROM 24 stores therein a number of sets of outline data defining character shapes. One set of outline data can be read out separately for each character. Each set of outline data represents a combination of straight and curved outline segments formed into a single outline of one character. FIG. 4(a) shows one example of the outline data representative of a character outline shown in FIG. 4(b). As apparent from FIG. 4(a), the outline data is constructed from flag data and corresponding coordinate values. Flag S indicates that a corresponding coordinate value represents coordinates of a starting point of one series of outline segments. Flag S therefore serves as a command data indicating that a current position should be located at the corresponding coordinates. As apparent from FIGS. 4(a) and 4(b), Flag S of first occurrence indicates that the current position should be located at the coordinates (x0, y0). Flag L serves as a command data indicating that a straight line should be drawn from the current position to corresponding coordinates and then that the current position should be changed into the corresponding coordinates. In this example, Flag L of first occurrence on the table of FIG. 4(a) indicates that a straight line should be drawn from (x0,y0) to (x3,y3). Flag B serves as a command data indicating that a third order Bezier line should be drawn from the current position and the current position should be changed into an end point of the third order Bezier line. Third order Bezier line is generally defined by its start point, its first and second control points and its end point. Since the start point is determined by the current position, Flag B is defined together with corresponding three coordinate values, i.e., coordinate values of the first and second control points and the end point. In this example, Flag B of first occurrence on the table of FIG. 4(a) indicates that a third order Bezier line should be drawn from the start point (x3,y3) toward the end point (x0,y0) using the first and second control points (x2,y2) and (x1,y1) in this order.

The character ROM 24 also stores therein information on predetermined reference directions, a predetermined correction angle range, and a predetermined error tolerance value, all needed to determine which line segments require correction according to the present invention. As will be described later, only straight line segments that meet conditions of both the predetermined correction angle range with respect to the predetermined reference direction and that meet the error tolerance value are considered to actually require correction.

Figure 5:
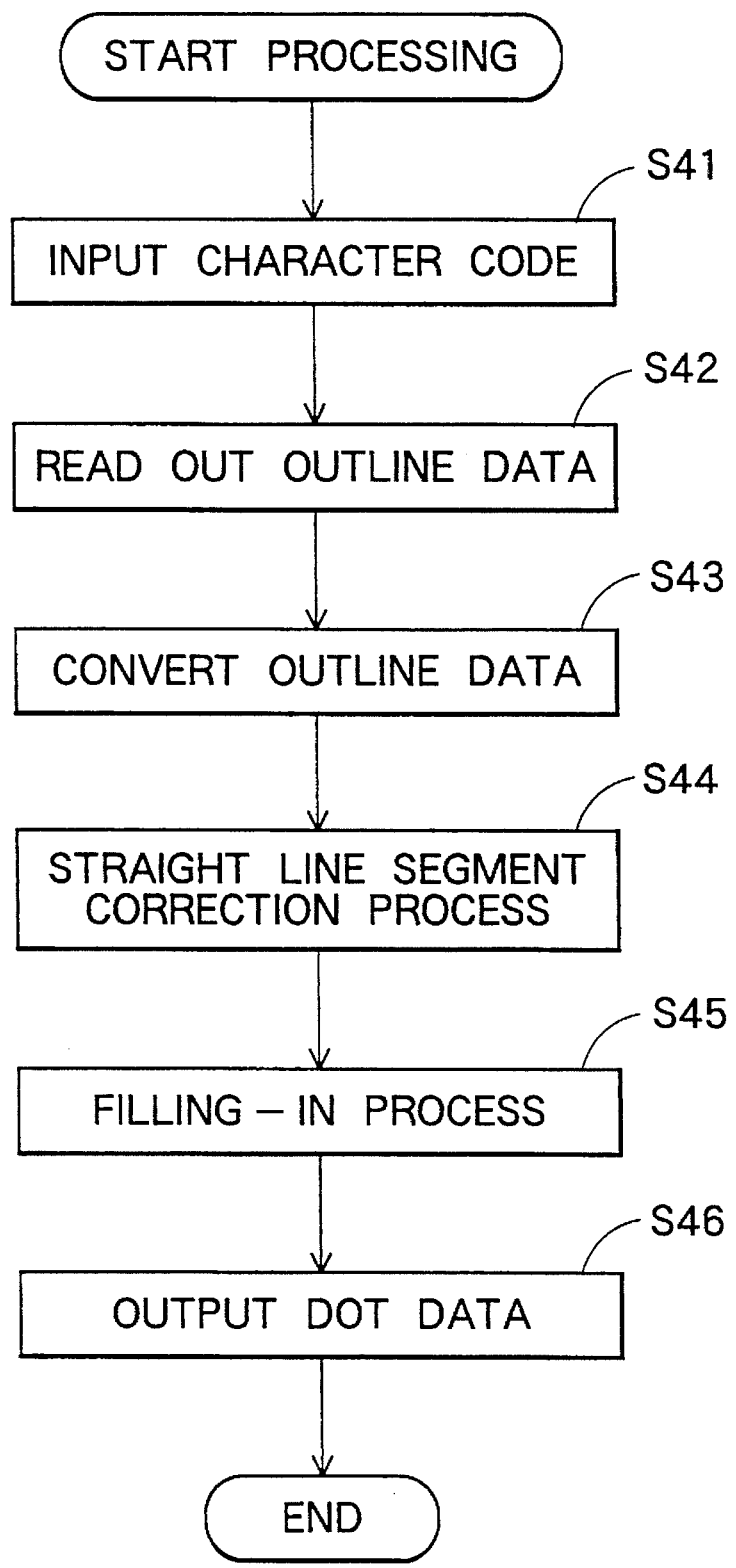
FIG. 5 shows a flow chart of an operation for converting outline data into dot data.

Next, a summary of processes for converting outline data to dot data according to the present embodiment will be explained while referring to the flowchart in FIG. 5.

First, information on the characters to be printed is inputted in step S41. More specifically, character codes representative of the desired characters and information on the desired character positions, character sizes, and character appearance, etc. are inputted. Then, outline data corresponding to each character code is read out from the character ROM 24 in step S42. Next, in step S43, coordinate values of points on an outline represented by the outline data are subjected to a scaling operation so as to be converted into a size of the character desired to be printed. The outline data are further subjected to rotation, inversion, and other designated requirements represented by the information inputted in step S41. In this step S43, the coordinate values are then converted into those as defined in view of the pixel screen which represents the scanning operation achieved by the printing device 21. Since the printing device 21 of this example performs a raster scanning operation, the pixel screen used in this example is determined in correspondence with the raster scanning operation. In the present invention, when necessary, the coordinate values of a straight outline segment that slants slightly with respect to the predetermined reference direction are corrected in step S44, as will be described in greater detail later. In step S45, then, the finally obtained coordinate values are subjected to a filling-in process. More specifically, the finally obtained coordinate values are first subjected to a scan conversion process, in which an outline represented by the coordinate values is superimposed on the pixel screen representative of the raster scanning operation of the printing device 21. Then, image dots are determined within the area surrounded by the outline. The outline is that area contained within the defined outline segments and excludes interior areas found in characters such as a, e, g, o, p, q, and 4 wherein the open area may be thought to lie "within" the outline. It is noted that various types of filling-in method can be applied to the step S45. For example, this step can employ a filling-in method of a type for locating a center position of each picture element for an image dot on or within the outline, and other types of filling-in methods. This step can employ filling-in method of types for quantizing or offsetting the coordinate values of the outline points through half-adjustment (rounding to the nearest integer), round up to the next higher integer, round down to the next lower integer, or other calculations and determining a picture element where an image dot should be located. Through the filling-in method, dot data are produced. Finally, in step S46, the dot data are temporarily stored in the dot data memory 27 before being outputted to the printing device 21. The printing device 21 will perform a raster scanning type printing operation, based on the dot data. Because the raster scanning techniques are well known, and also not central to the present invention, further explanation will be omitted.

Figure 6:
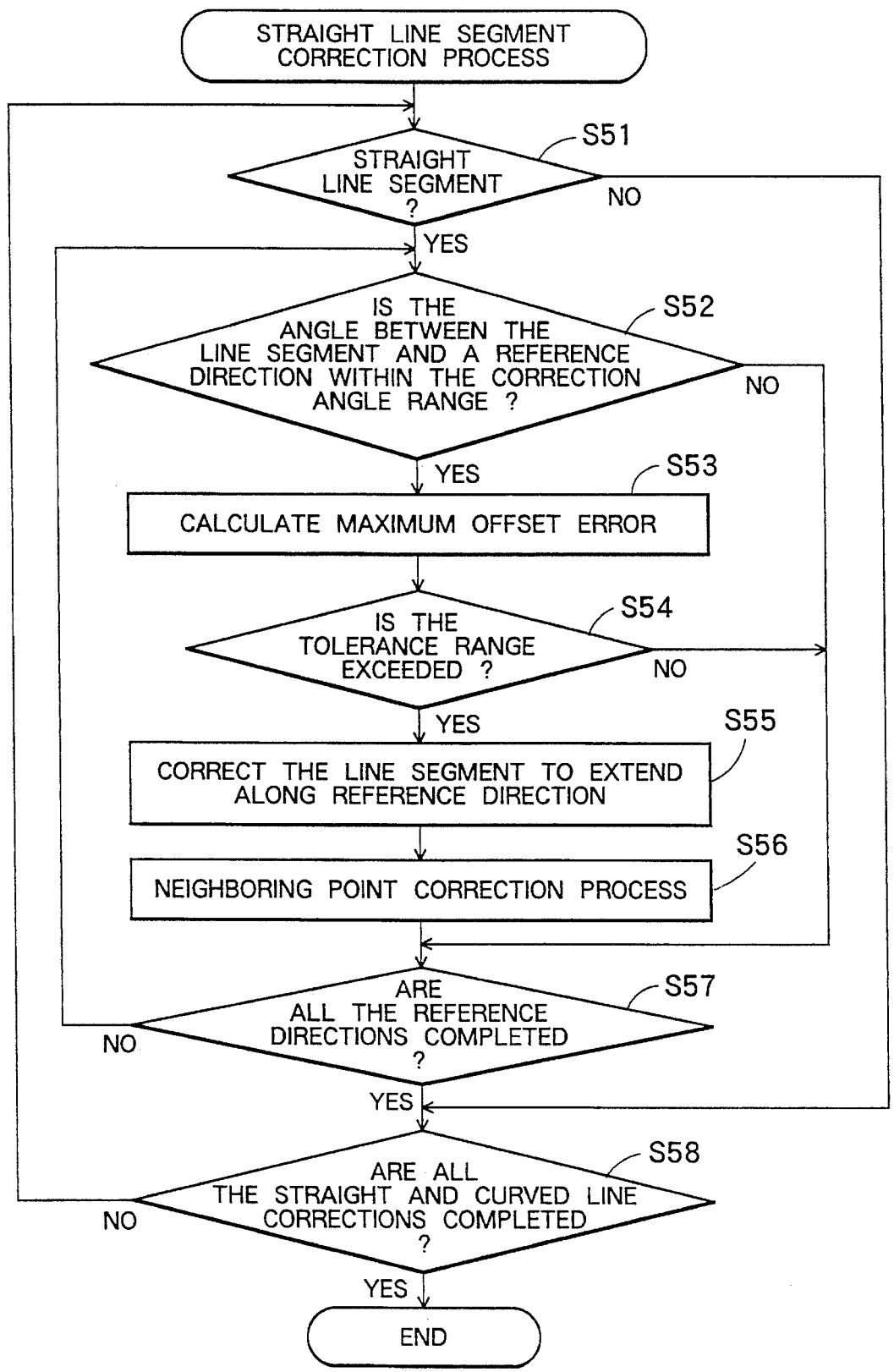
FIG. 6 shows a flow chart of a line segment correction step S44 of FIG. 5.
Figure 7:
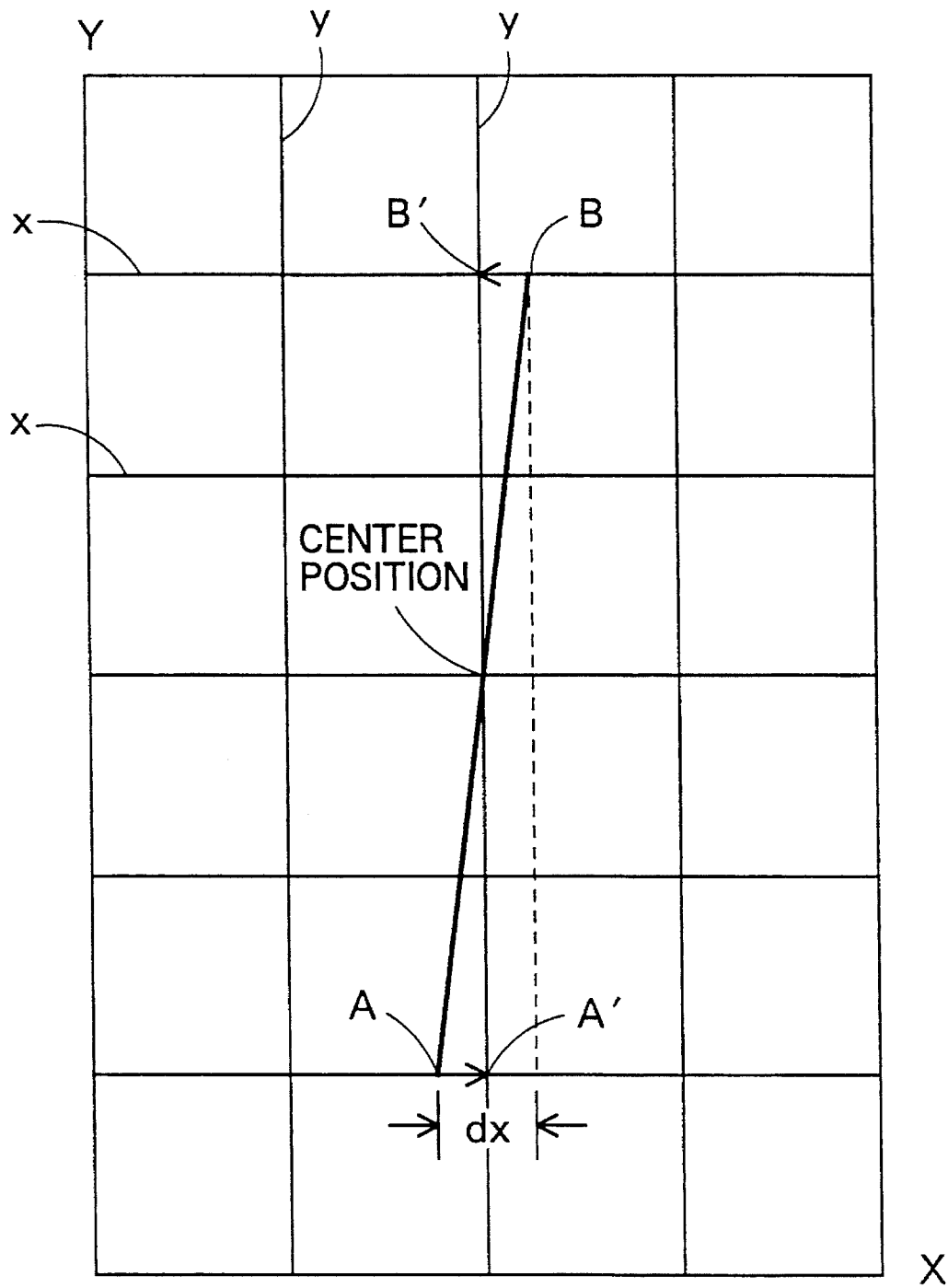
FIG. 7 illustrates the manner in which the offset error is calculated for a line segment and the manner in which the line segment is corrected in the line segment correction process.

The line segment correction process followed in step S44 will be described in greater detail while referring to FIGS. 6 and 7. By way of example, the outline data for the character "D" indicated in FIGS. 4(a) and 4(b) is converted into dot data. In the preferred embodiment, the predetermined reference directions for determining which line segments will be corrected are the X axis and the Y axis.

In step S51, flag data in the outline data as shown in FIG. 4(a) are searched to locate a flag L representative of a straight line. If flag L is found out by the straight line determining means M3, then, in step S52, an angle defined between the predetermined reference direction (i.e., either the X or Y axis) and the straight line represented by the flag L is calculated by the angle determining means M8a based upon coordinates as determined by the coordinate defining means M8. Then, it is judged whether the angle falls within a predetermined correction angle range. The correction angle range is a small angle range, for example, a range between 3° and +3° (±3°), −5° and +5° (±5°), etc. Accordingly, when the angle falls within the correction angle range, it is judged that the angle defined between the line segment and the predetermined reference line is very small. In other words, it is judged that the line segment under consideration slants with respect to the reference line very slightly. In this case, as described already, inferior character quality will possibly occur due to the offset process (i.e., through the filling-in process of the step S45 of FIG. 5). Therefore, if the angle falls within the correction angle range, the program proceeds to step S53.

In the step S53, a offset error which might be possibly occurred at maximum through the filling-in process (i.e., the offset process) of the step S45 is calculated by a maximum calculating means M5a. In other words, the maximum offset error is calculated. This step will be described in detail below with reference to FIG. 7.

Now, assume that the predetermined reference direction is the Y axis in the pixel screen. Hereinafter, a direction defined in the pixel screen extending perpendicular to (at right angles to) the predetermined reference direction will be referred to as a perpendicular direction. The perpendicular direction is now the X axis. To determine the maximum offset error, first, the difference (dx in FIG. 7) is determined along the perpendicular direction (X axis) between two end points (points A and B in FIG. 7) of the slanted straight outline segment under consideration (line A-B in FIG. 7). If, for example, the value of dx meets the following condition:

$0 < dx \leq 1$, then the outline segment under consideration possibly traverses the border of two different picture elements on the pixel screen, in accordance with the relative position of the outline segment with respect to the pixel screen. Accordingly, a one-dot shift might occur when the outline segment is subjected to the filling-in process. Similarly, when the value of dx meets the following condition:

$(n-1) < dx \leq n$, where n is an integer $\geq 1$, an n-dot shift might possibly occur.

Accordingly, the distance dx is rounded up to the nearest larger integer to yield the maximum offset error. For example, if the predetermined reference direction is vertical and dx is 1.1, the maximum offset error becomes 2. When the predetermined reference direction is horizontal and the distance dy is 0.6, the maximum offset error becomes 1.

After the maximum offset error is thus calculated, the program proceeds to step S54. In the step S54, it is judged whether the offset error exceeds a predetermined tolerance range by the maximum offset error judging means M5b. This step first calculates a ratio of the maximum offset error with respect to the difference in position along the perpendicular direction between the two end points of the outline segment under consideration. If the ratio is equal to or greater than a predetermined value (for example, 2), it can be judged that the maximum offset error exceeds the tolerance level. For example, when the value of dx shown in FIG. 7 is 0.3, the maximum offset error becomes 1, and therefore the ratio is about 3.3 (i.e. 1/0.3). Since this value exceeds the predetermined tolerance value of 2, the tolerance value is judged to be exceeded. In this case, the maximum offset error can be judged to be relatively large with respect to the size of the outline segment under consideration. There is a high possibility that the offset error might cause extremely pronounced dot shifts and destroy the character design. In such cases, therefore, the program proceeds to step S55 for amending the outline segment so as to eliminate the offset error. To summarize, correction process of the step S55 is performed when the ratio of the maximum offset error with respect to the size of the character is great. The correction is performed when the slant will very likely destroy the desired character design.

In the step S55, the outline segment under consideration is corrected to match the predetermined reference direction. That is, the outline segment is amended to extend in the reference direction. This correction is achieved by shifting each of the two end points of the outline segment to an intersection point of a respective line extending in the perpendicular direction that passes through the corresponding end point and a line extending in the reference direction that passes through the central point of the outline segment to thereby creating a new line segment. In the present example of FIG. 7, the end points A and B are shifted to points A' and B', respectively. Thus, the outline segment A-B is corrected into a new outline segment A-B'.

In this case, the correction of the outline segment A-B into the new outline segment A'-B' might sacrifice the designer's intention to provide this outline segment slightly slanted from the reference direction (Y axis). More specifically, the correction reduces into zero an angle formed between the outline segment and the Y axis. However, this correction may preserve the appearance of the character during the filling-in process regardless of the relative position of the character with respect to the pixel screen.

Figure 8:
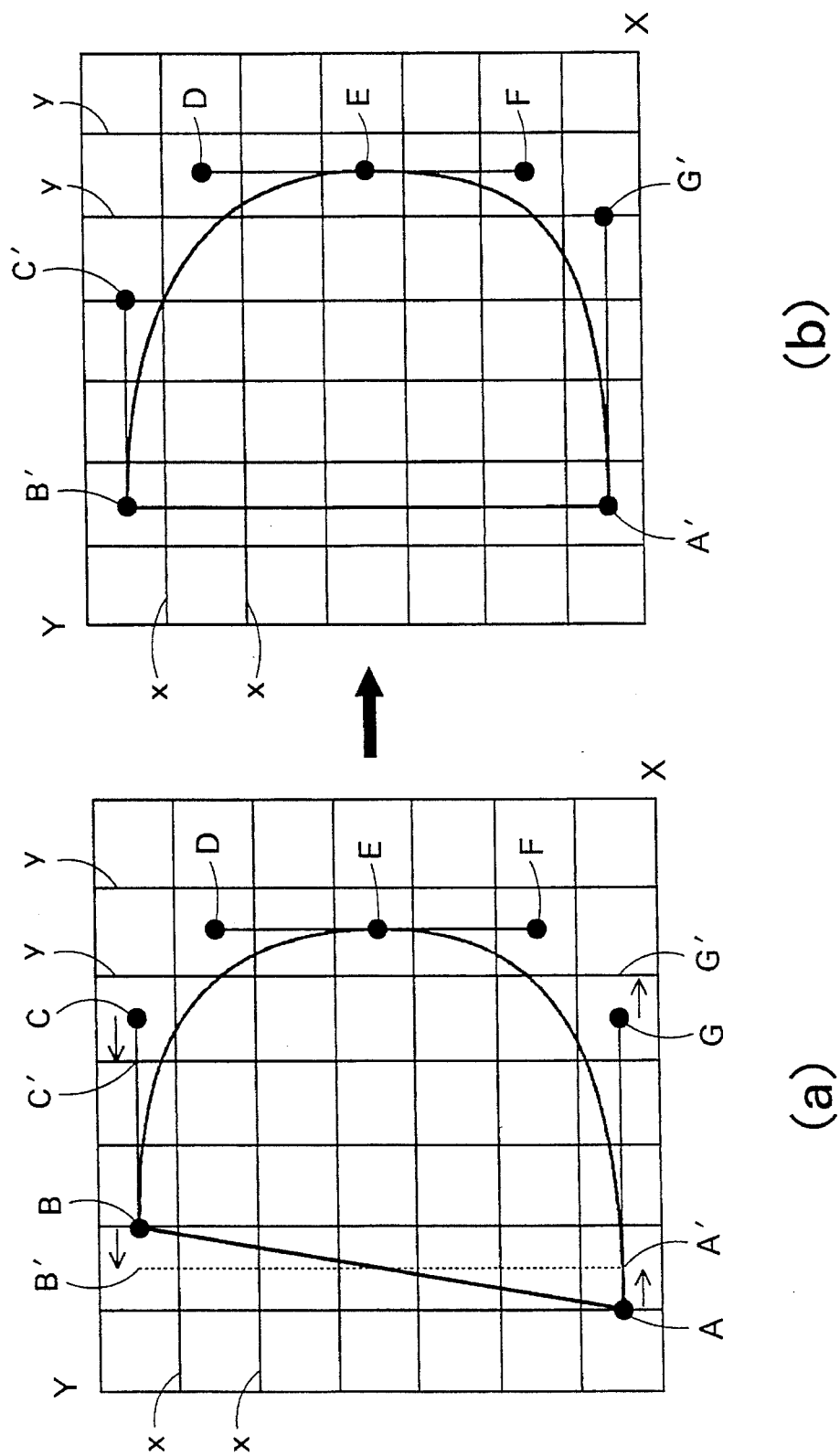
FIG. 8 shows the manner how an outline shown in (a) is converted into an outline shown in (b) through the line segment correction process and a neighboring point control process.
Figure 9:
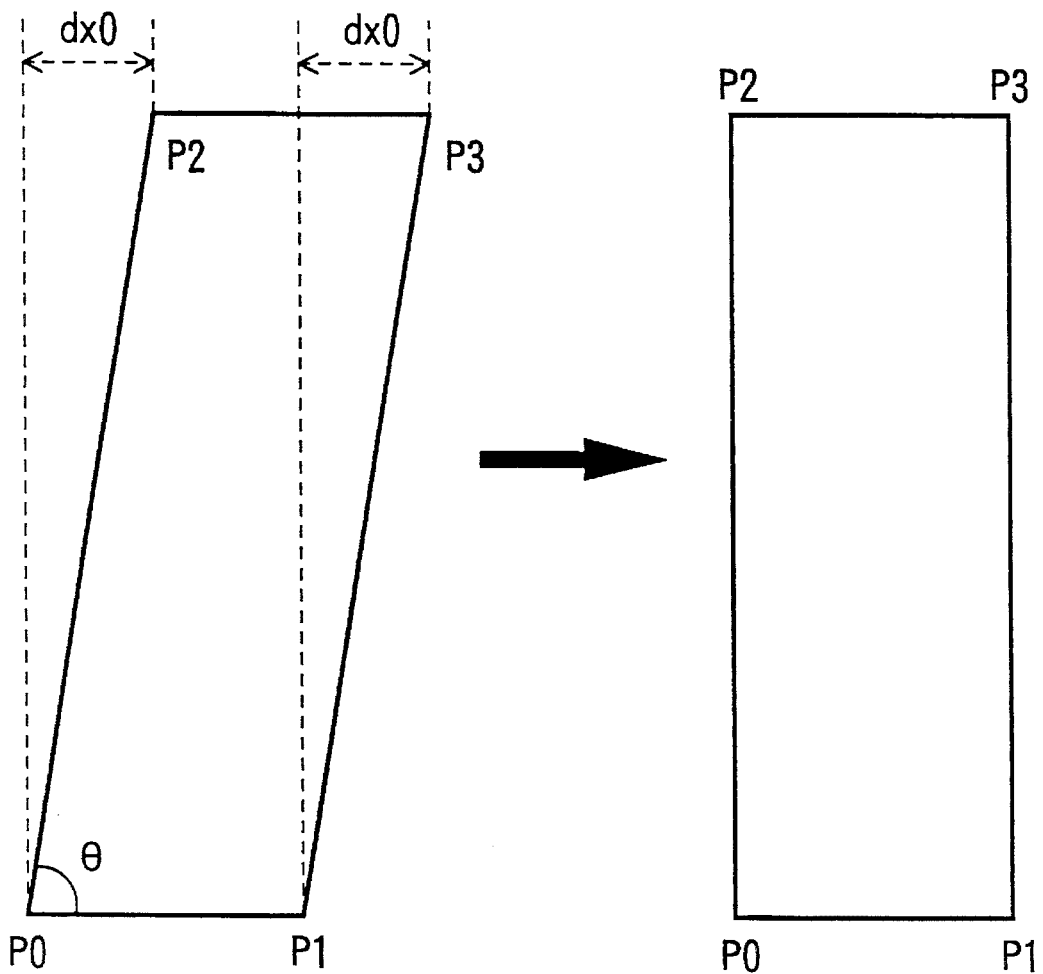
FIG. 9 shows the manner in which an outline shown in (a) is converted into an outline shown in (b) through the line segment correction process.

In the case where a third order Bezier line segment is directly connected to the line segment under consideration, as determined by the curved line segment determining means m6a and as shown in FIG. 4(b), the shifting the two end points into new points necessitates adjusting the control points for the Bezier outline segment by the adjusting means M6b in order to maintain the overall shape of the character. This is because shifting the end points of the outline segment might change (for example, inverse) the relative position between the end points of the outline segment and the control points of the third order Bezier line, resulting in a change of the Bezier curve, and accordingly change the overall shape of the character. Accordingly, the program proceeds from step S55 to step S56 of a neighboring point correction process. The process of step S56 will be described below by way of example of FIG. 8. The outline shape as shown in (a) of FIG. 8 is converted into that as shown in (b) through the correction in the step S55 and the adjustment in step S56. The outline in this example consists of a straight line segment A-B, a third order Bezier line segment B-E, and another third order Bezier line segment E-A. The Bezier line segment B-E is directly connected to the point B of the straight line segment A-B in such a manner that the point B serves as a starting point for the Bezier line. The Bezier line segment B-E is defined by the starting point B, a first control point C, a second control point D and an end point E. In other words, the Bezier line segment B-E is determined by using the four points B, C, D and E in this order. The other Bezier line segment E-A is directly connected to the point A of the straight line segment A-B and the point E of the Bezier line segment B-E in such a manner that the points E and A serve as a start and end points for the Bezier line, respectively. The Bezier line segment E-A is defined by the starting point E, a first control point F, a second control point G and the end point A. In other words, the Bezier line segment E-A is determined by using the four points E, F, G and A in this order. In this example, the predetermined reference direction is vertical (Y axis) and the perpendicular direction is horizontal X axis).

The steps S51 through S55 shift the point A to the new point A' and the point B to a new point B' so as to convert the straight line segment A-B into a new straight line segment A'-B'. Because the end point B of the line segment A-B serves also as the start point B of the Bezier curve B-E, when the process S55 shifts the start point B to the new point B', the curve B-E will probably be greatly disfigured if the first control point C which is used immediately after the start point B for determining the curve B-E is not moved simultaneously. Therefore, the step S56 shifts the control point C by the same distance in the same direction as the step S55 shifts the point B, so that a new control point C' is produced. It is noted that the step S56 does not shift the second control point D or the end point E. The step S55 shifts only the point C that is used for defining the Bezier line segment B-E immediately after the point B. A new Bezier line segment B'-E is therefore produced by the points B', C', D and E.

Similarly, because the end point A of the line segment A-B serves also as the end point A of the Bezier curve E-A, when the process S55 thus shifts the end point A to the new point A', the curve E-A will probably be greatly disfigured if the second control point G which is used immediately before the end point A for determining the curve E-A is not moved simultaneously. Accordingly, the step S56 shifts the second control point G of the Bezier line segment E-A by the same distance in the same direction as the step S55 shifts the point A, so that a new control point G' is produced. It is noted that the step S56 does not shift the first control point F or the start point E. The step S55 shifts only the point G that is used for defining the Bezier line segment E-A immediately before the point A. A new Bezier line segment E-A' is therefore defined by the points E, F, G' and A'.

Thus, the step S56 shifts only one control point of each Bezier line segment directly connected to a corresponding end point of the straight line segment that is used immediately before or after the corresponding end point for defining the corresponding Bezier line segment. This control point will be referred to as a control point neighboring the corresponding end point of the straight line segment.

To summarize, in the step S56, when a Bezier line segment is directly connected to the straight line segment under consideration, the neighboring control point for the Bezier line segment is shifted by the same distance and in the same direction as the corresponding end point. Thus moving the neighboring control point together with the corresponding end point of the straight line segment is termed neighboring correction in the present invention. It should be noted that this neighboring correction is unnecessary for any straight line segments directly connected to the straight line segment under consideration. This is because they can retain their shape fairly well even though the neighboring correction is not performed to those adjacent straight line segments. Moving the neighboring control points can be carried out following a number of different methods. For example, the neighboring control points can be moved within a certain threshold value, or moved by a distance dependent on the distance by which the corresponding end point of the straight line segment is moved in the step S55.

Whether steps S52 through S56 have been performed in regards to all the predetermined reference directions, for example, both the vertical and horizontal axes, is determined in step S57. Whether corrections have been performed as required to all straight lines and adjustments to all corresponding curved lines is determined in step S58. Processes are completed when all the outline segments are completed.

A concrete example according to the present embodiment will be described below. The concrete example describes correction for an outline of the character "I" shown in (a) of FIG. 9 into that shown in (b) of FIG. 9. When the current position is the point P0, the line segment P0-P2 is determined as being a straight line segment in step S51. The angle θ of the line segment is then determined in step S52. Using the coordinates shown in (a) of FIG. 9, the angle θ is determined as 85.71° (i.e., arctan (4.0/0.3)). The difference between the angle θ (85.71°) and an angle (90° in this example) defining one of the predetermined reference direction (vertical direction in this example) is calculated as −4.29° (i.e., 85.71°−90°). In this example, the correction angle range is determined as ±5°. Because the difference is within the predetermined correction angle range (i.e., +5°>−4.29°>−5°), the program proceeds to step S53 where the maximum offset error is calculated. To determine the maximum offset error, the difference dx0 (dx0=0.3) in distance in the direction of the perpendicular direction (the horizontal direction in this example) between P0 and P3 is rounded up to the nearest larger integer, i.e., 1. Next, the ratio between the maximum offset error (i.e., 1) and the difference dx0 (i.e., 0.3) is determined as about 3.3 (=1/0.3) in step S54 by a ratio calculating means M5b1. The predetermined tolerance value is 2 in this example. Correction is determined as necessary because the ratio of 3.3 exceeds the predetermined tolerance value of 2 (i.e., 3.3>2) as judged by a ratio judging means M5b2. Points P0 and P2 are shifted in the perpendicular direction (horizontal direction) so as to become aligned witch the predetermined reference direction (vertical direction) passing through the middle point (0.15, 2.0) of the line P0-P2. The new line P0-P2 has therefore P0 coordinates of (0.15,0.0) and P2 coordinates of (0.15, 4.0). In this case, because neither P0 nor P2 is an end point of a curved line, neighboring correction processes are unnecessary.

While the invention has been described in detail with reference to the specific embodiment thereof, it would be apparent to those skilled in the art that various changes and modifications may be made therein without departing from the spirit of the invention.

For example, although in the depicted embodiment, determining whether a line segment should be corrected has been based on two types of reference directions, that is, vertical and horizontal directions the, need for correction could be based on any other direction, such as a direction which forms a positive or negative 45° angle to the horizontal or vertical directions. Also, more than two reference directions could be used.

Also, the steps S53 and 54 can be replaced with a method of simply correcting all straight line segments when they have the offset error of 1. Correction may not be performed when the offset error is 2 or more. Normally, the offset error produces the greatest problem when an entire 1 dot shift occurs although a line slants at only a slight angle, for example, the difference between the two end points of a line is only about 0.1 or 0.2 dots. The offset error produced when the difference is originally 2 or 3 dots rarely produces adverse affects on the aesthetic quality of characters. Therefore, even in a simple calculation method, such as limiting the quantitative error to one dot obtains sufficient effect.

Straight line segments can also be suitably corrected in the step S55 by rotating the straight line segment to the orientation of the predetermined reference line.

Also, curved line segments are described in the depicted embodiment as third order Bezier curves. However, other curves, such as other order Bezier curves, spline curves, or B spline curves, could be applied.

The above-described embodiment is directed to the case where the printing device 21 is of the raster scanning type. However, other various types of printing devices can be used. The processings to outline segment data in the steps S44 (S51–58) and S45 may be performed with respect to the pixel screen corresponding to the scanning method employed in the printing device.

As is evident from the above description, a data converting apparatus according to the present invention performs correction which restricts (controls) the quantization error of line segments near a predetermined reference direction, these line segments particularly affecting character quality. Thus, regardless of the dot number comprising the character, because symmetry of the character dot pattern is maintained and variation is greatly reduced, high-quality character patterns can be obtained.

In the above described embodiment, the pixel screen representative of the raster scanning operation is used, since the raster scanning type printing device 21 is used. However, other types of printing device can be used and various types of pixel screens corresponding to the type of the printing device can be used. Similarly, various types of filling-in methods can be used in the present invention.

What is claimed is:

1. A data converting apparatus for converting a set of outline data representative of an outline of a desired image, such as a character, into a set of dot data representative of a dot image corresponding to the desired image, said apparatus comprising:

a memory means for storing at least one set of outline data, each set of outline data representative of an outline of an image;

selection means for selecting a set of outline data representative of an outline of a desired image;

coordinate defining means for defining the outline of the desired image selected by said selection means relative to a coordinate system where the dot image corresponding to the desired image is to be formed, said coordinate defining means converting the outline data for the desired image selected by said selection means into data of coordinate values indicative of a position of at least one point on the outline of the desired image relative to the coordinate system, picture elements being defined in the coordinate system;

straight line segment determining means for determining whether the set of outline data of the desired image selected by said selection means includes at least one straight line segment;

direction determining means for determining whether a difference defined between a direction of each straight line segment and a predetermined reference direction falls within a predetermined range by comparing, with the predetermined reference direction, each straight line segment of the outline determined by said straight line segment determining means, when the straight line segment determining means determines that the set of outline data of the desired image includes at least one straight line segment;

offset error determining means for determining whether an offset error, which will be produced when a straight line segment that is determined by said direction determining means to have a difference falling within the predetermined range is converted to a dot image, deviates from a predetermined tolerance range, the offset error determining means including maximum calculating means for calculating a maximum value of offset error which would occur dependent on a position of the straight outline segment relative to the coordinate system and maximum offset judging means for judging whether the maximum value of the offset error falls outside from the predetermined tolerance range;

correction means for correcting a straight line segment, that is determined by said offset error determining means to produce an offset error deviating from the predetermined tolerance range, so that the offset error of the determined straight line segment may not fall outside the tolerance range, the correction means correcting the coordinate values indicative of a position of at least one point on the corrected straight line segment relative to the coordinate system; and filling-in means for converting the outline data including any straight line segment corrected by said correction means to a dot image and outputting dot data for creation of the dot image, said filling-in means including picture element determining means for determining, based on the coordinate values, picture elements where image dots should be located for substantially reproducing the desired image, and dot data producing means for producing the dot data for an image dot to be formed in each of the determined picture elements.

2. A data converting apparatus as claimed in claim 1, wherein the predetermined reference direction is defined in the coordinate system, and wherein the difference is defined as an angle and the predetermined range is a predetermined threshold angle.

3. A data converting apparatus as claimed in claim 1, wherein said picture element determining means quantizes the at least one of the coordinate values through one of a rounding to the nearest integer calculation, rounding up to a next higher integer calculation and rounding down to a next lower integer calculation.

4. The data converting apparatus as claimed in claim 3, wherein the data of coordinate values for the outline of the desired image determined by said straight line segment determining means include coordinate values of both end points of a straight outline segment relative to the coordinate system, and wherein said maximum calculating means rounds up to the next larger integer a distance between the two end points of the straight outline segment defined in the coordinate system as projected onto a line extending in a perpendicular direction to the predetermined reference direction so as to obtain the maximum value of offset error.

5. The data converting apparatus as claimed in claim 4, wherein said maximum offset judging means includes:

ratio calculating means for calculating a ratio of the maximum value of offset error with respect to the distance between the two end points of the straight outline segment defined in the coordinate system as projected on the line extending in the perpendicular direction; and ratio judging means for judging whether the ratio exceeds a predetermined tolerance level.

6. The data converting apparatus as claimed in claim 5 wherein said correction means shifts the opposite end points of the straight line segment in the coordinate system along the perpendicular direction so as to position the opposite end points on a straight line which passes through a central position of the straight line segment and extends along the predetermined reference direction.

7. The data converting apparatus as claimed in claim 6, further comprising:

curved line segment determining means for determining whether the outline of the desired image determined by said straight line segment determining means is directly connected to a curved line segment; and adjusting means for adjusting the curved line segment determined by said curved line segment determining means to correspond to the correction said correction means applies to the straight line segment.

8. The data converting apparatus as claimed in claim 1, wherein said memory means stores a set of outline data for each of a plurality of outlines of images, and further comprising input means for inputting at least one desired image, said selection means selecting a set of outline data indicative of each input desired image.

9. The data converting apparatus as claimed in claim 1, further comprising reproducing means for producing the dot image in accordance with the dot data outputted from said filling-in means to thereby reproduce the desired image.

10. A data converting apparatus for converting a set of original outline data representative of an outline of a desired image such as a letter, a symbol or a graphical representation, into a set of dot data which is indicative of whether an image dot is to be formed in each of a plurality of picture elements positioned in a coordinate system to form a dot representation of the desired image, said apparatus comprising:

memory means for storing a plurality of sets of original outline data each indicative of an outline of an image;

selection means for selecting one set of original outline data indicative of an outline of one desired image;

coordinate defining means for converting the original outline data for the desired image into original data of coordinate values indicative of a position of at least one point on the outline of the desired image relative to a coordinate system where picture elements are defined to be arranged, the original data of coordinate values including coordinate values of opposite end points of each of at least one straight line segment if the outline of the desired image includes at least one straight line segment;

straight line segment determining means for determining whether the outline selected by said selecting means includes at least one straight line segment;

angle determining means for determining whether an angle defined between each of the at least one straight line segment determined by said straight line segment determining means and a predetermined reference direction defined in the coordinate system falls within a predetermined threshold angle;

offset error determining means for determining whether an offset error, which may occur as a result of offsetting of coordinate values of opposite end points of the straight line segment determined by said angle determining means to fall within the predetermined threshold angle, calculated as a ratio of the offsetting and a distance obtained from projecting the opposite end points on a line tangent to one end point and perpendicular to the predetermined reference line, exceeds a predetermined tolerance range;

correction means for correcting the straight line segment determined by said offset error determining means into a corrected straight line segment whose opposite end points do not exceed the predetermined tolerance range, said correcting means changing the original data of coordinate values for the outline including the corrected straight line segment into corrected data of coordinate values; and filling-in means for offsetting one of the original data of coordinate values and the corrected data of coordinate values for the outline of the desired image so as to determine picture elements on the coordinate system where image dots should be located for producing a dot image substantially reproducing the desired image and for producing a set of dot data indicative of the dot image.

11. A character output device for outputting a character image, comprising:

memory means for storing one set of outline data representative of an outline for each of a plurality of characters, which set may include at least one straight line segment;

direction determining means for comparing at least one straight line segment of a set of selected outline data with a predetermined reference direction and for determining whether an angle defined between a direction of each straight line segment and the predetermined reference direction falls within a predetermined range of angles;

offset error determining means for determining whether an offset error produced when a straight line segment determined by the direction determining means as falling within the predetermined range of angles is converted to a dot image exceeds a predetermined tolerance range, the predetermined tolerance range being a ratio of maximum offset to actual offset;

correction means for correcting the straight line segment determined by the offset error determining means so that the offset error of the straight line segment does not exceed the predetermined tolerance range; and filling-in means for converting the outline data including the straight line segment corrected by the correction means to a dot image and outputting dot data representative of the dot image.

* * * * *